(12) United States Patent
Baltz

(10) Patent No.: US 8,312,896 B2
(45) Date of Patent: Nov. 20, 2012

(54) AIR VALVE FOR SPRAY GUNS

(75) Inventor: James P. Baltz, Waterville, OH (US)

(73) Assignee: Illinois Tool Works Inc., Glenview, IL (US)

( * ) Notice: Subject to any disclaimer, the term of this patent is extended or adjusted under 35 U.S.C. 154(b) by 1505 days.

(21) Appl. No.: 11/203,864

(22) Filed: Aug. 15, 2005

(65) Prior Publication Data

US 2007/0034268 A1 Feb. 15, 2007

(51) Int. Cl.
*F16K 39/02* (2006.01)
(52) U.S. Cl. .................... 137/630.15; 239/528; 239/583
(58) Field of Classification Search ............. 137/630.15; 239/583, 290, 527, 528
See application file for complete search history.

(56) References Cited

U.S. PATENT DOCUMENTS

| | | | | |
|---|---|---|---|---|
| 1,824,017 | A | * | 9/1931 | Bramsen et al. ............ 239/528 |
| 2,068,161 | A | * | 1/1937 | Bramsen et al. ............ 239/580 |
| 2,112,546 | A | * | 3/1938 | Smart ......................... 239/300 |
| 2,213,488 | A | * | 9/1940 | Dowrick et al. ......... 137/630.15 |
| 2,477,237 | A | * | 7/1949 | Carr ........................ 137/596.1 |
| 2,734,776 | A | * | 2/1956 | Elliott ......................... 239/583 |
| 2,737,415 | A | * | 3/1956 | Wheeler-Nicholson ...... 239/133 |
| 2,804,343 | A | * | 8/1957 | Friedell ....................... 239/415 |
| 2,888,176 | A | | 5/1959 | Miller |
| 3,102,555 | A | * | 9/1963 | Botkin ..................... 137/630.15 |
| 3,169,882 | A | | 2/1965 | Juvinall et al. |
| 3,198,088 | A | * | 8/1965 | Johnson et al. ................ 91/420 |
| 3,498,324 | A | * | 3/1970 | Breuning ................. 137/614.04 |
| 3,631,894 | A | * | 1/1972 | Frantz ..................... 137/630.15 |
| 4,002,777 | A | | 1/1977 | Juvinall et al. |
| 4,175,702 | A | * | 11/1979 | Hetherington et al. ....... 239/113 |
| 4,285,446 | A | | 8/1981 | Rapp et al. |
| 4,802,627 | A | | 2/1989 | Moy et al. |
| 4,824,026 | A | | 4/1989 | Tamura et al. |
| 4,925,252 | A | * | 5/1990 | Hee .............................. 303/89 |
| 5,219,097 | A | | 6/1993 | Huber et al. |

(Continued)

FOREIGN PATENT DOCUMENTS

EP 0 846 904 A1 6/1998

(Continued)

OTHER PUBLICATIONS

"REA-90 and REA-90L Electrostatic Spray Guns Dual Atomization Technology", Service Manual, Ransburg, 2005 Illinois Tool Works Inc. "REA-90A and REA-90LA Automatic Electrostatic Spray Guns Dual Atomization Technology" Service Instruction, ITW Ransburg Electrostatic Systems, 2004 Illinois Tool Works Inc.
"REA-70 and REA-70L Electrostatic Spray Guns Dual Atomization Technology" Service Manual, Ransburg, 2005 Illinois Tool Works Inc.

(Continued)

*Primary Examiner* — Craig Schneider
*Assistant Examiner* — Craig J Price
(74) *Attorney, Agent, or Firm* — Barnes & Thornburg LLP

(57) ABSTRACT

A compressed gas-aided coating dispensing device includes a valve controlling the flow of compressed gas through the device. The device includes a port for coupling to a source of compressed gas and a port through which the compressed gas flows downstream from the valve. The valve includes a first valve member and a first seat cooperating to control flow through the device, and an operating member for controlling the relative positions of the first valve member and first seat. The valve further includes a second valve member and a second seat. The operating member also controls the relative positions of the second valve member and the second seat. The operating member controls the relative positions of the first valve member and first seat and the second valve member and second seat.

7 Claims, 3 Drawing Sheets

U.S. PATENT DOCUMENTS

| | | | |
|---|---|---|---|
| 5,261,610 A | 11/1993 | Waryu et al. | |
| 5,667,143 A * | 9/1997 | Sebion et al. | 239/415 |
| 5,787,928 A | 8/1998 | Allen et al. | |
| 6,425,533 B1 | 7/2002 | Shilton et al. | |
| 6,644,295 B2 | 11/2003 | Jones | |
| 6,854,672 B2 | 2/2005 | Allen | |
| 2004/0195369 A1 * | 10/2004 | Strong | 239/296 |

FOREIGN PATENT DOCUMENTS

| | | |
|---|---|---|
| JP | 9-220500 | 8/1997 |
| WO | WO 94/13404 | 6/1994 |

OTHER PUBLICATIONS

"REA-III and REA-IIIL Delta Electrostatic Spray Guns Dual Atomization Technology" Service Instruction, ITW Ransburg Electrostatic Systems, 2004 Illinois Tool Works Inc.

"REA-IV and REA-IVL Delta Electrostatic Spray Guns Dual Atomization Technology", Service Instruction, ITW Ransburg Electrostatic Systems, 2003 Illinois Tool Works Inc.

"M90 Handguns" Service Manual, Ransburg, 2005 Illinois Tool Works Inc.

* cited by examiner

AIR VALVE FOR SPRAY GUNS

FIELD OF THE INVENTION

This invention relates to a valve structure. It is disclosed in the context of a structure for an air valve for a dispensing device, such as a handheld coating material dispensing device, sometimes referred to hereinafter as a handgun or gun. However, it is believed to have other applications as well.

BACKGROUND OF THE INVENTION

Handheld coating material dispensing devices of various types are well-known. There are, for example, the guns illustrated and described in U.S. Pat. Nos. 2,888,176; 3,169,882; 4,002,777; 4,285,446; 4,802,627; 4,824,026; 5,219,097; 5,261,610; 5,787,928; 6,425,533; 6,644,295; and, 6,854,672. There are also the disclosures of European Patent 0 846 904, published PCT application WO 9413404, and Japanese published patent application 9-220500. There are also the Ransburg model REA 3, REA 4, REA 70, REA 90, REM and M-90 guns, all available from ITW Ransburg, 320 Phillips Avenue, Toledo, Ohio, 43612-1493. No representation is intended by this listing that a thorough search of all material prior art has been conducted, or that no better art than that listed is available. Nor should any such representation be inferred. The disclosures of all of the above are hereby incorporated herein by reference.

DISCLOSURE OF THE INVENTION

According to an aspect of the invention, a compressed gas-aided coating dispensing device includes a valve controlling the flow of compressed gas through the device. The device includes a port for coupling to a source of compressed gas and a port through which the compressed gas flows downstream from the valve. The valve includes a first valve member and a first seat cooperating to control flow through the device, and an operating member for controlling the relative positions of the first valve member and first seat. The valve further includes a second valve member and a second seat. The operating member also controls the relative positions of the second valve member and the second seat. The operating member controls the relative positions of the first valve member and first seat and the second valve member and second seat such that the first valve member moves away from the first seat first as the operating member is moved by an operator to open the valve, and the second valve member then moves away from the second seat as the operator continues to open the valve.

Illustratively according to this aspect of the invention, an area of an upstream side of the first valve member which is exposed to the source pressure tending to hold the first valve member against the first seat is smaller than a combined area of the upstream side of the first valve member exposed to the source pressure tending to hold the first valve member against the first seat plus an area of an upstream side of the second valve member exposed to the source pressure tending to hold the second valve member against the second seat. This configuration results in less force being required to move the first valve member from the first seat than to move the combination of the first valve member from the first seat plus the second valve member from the second seat.

According to another aspect of the invention, a compressed gas-aided coating dispensing device includes a valve controlling the flow of compressed gas through the device. The device includes a port for coupling to a source of compressed gas and a port through which the compressed gas flows downstream from the valve. The valve includes a first valve member and a first seat cooperating to control flow through the device, and an operating member for controlling the relative positions of the first valve member and first seat. The valve further includes a second valve member and a second seat. The operating member also controls the relative positions of the second valve member and the second seat. An area of an upstream side of the first valve member which is exposed to the source pressure tending to hold the first valve member against the first seat is smaller than a combined area of the upstream side of the first valve member exposed to the source pressure tending to hold the first valve member against the first seat plus an area of an upstream side of the second valve member exposed to the source pressure tending to hold the second valve member against the second seat. This results in less force being required to move the first valve member from the first seat than to move the combination of the first valve member from the first seat plus the second valve member from the second seat.

Illustratively according to these aspects of the invention, the dispensing device further includes a first spring for yieldably urging the first valve member against the first seat and a second spring for yieldably urging the second valve member against the second seat.

Illustratively according to these aspects of the invention, the first valve member comprises a first spring seat. The first spring is seated on the first spring seat and on the dispensing device.

Illustratively according to these aspects of the invention, the second valve member comprises a second spring seat. The second spring is seated on the second spring seat and on the dispensing device.

Illustratively according to these aspects of the invention, the first spring has a first spring constant and the second spring has a second spring constant greater than the first spring constant.

Illustratively according to these aspects of the invention, the second valve member includes a side facing upstream in the flow of compressed gas through the valve. The first seat is provided on the side of the second valve member facing upstream.

Illustratively according to these aspects of the invention, the second valve member includes a passageway on the downstream side of the first seat in the flow of compressed gas through the device. Movement of the first valve member away from the first seat permits compressed gas to flow through the passageway.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

Figure 1:
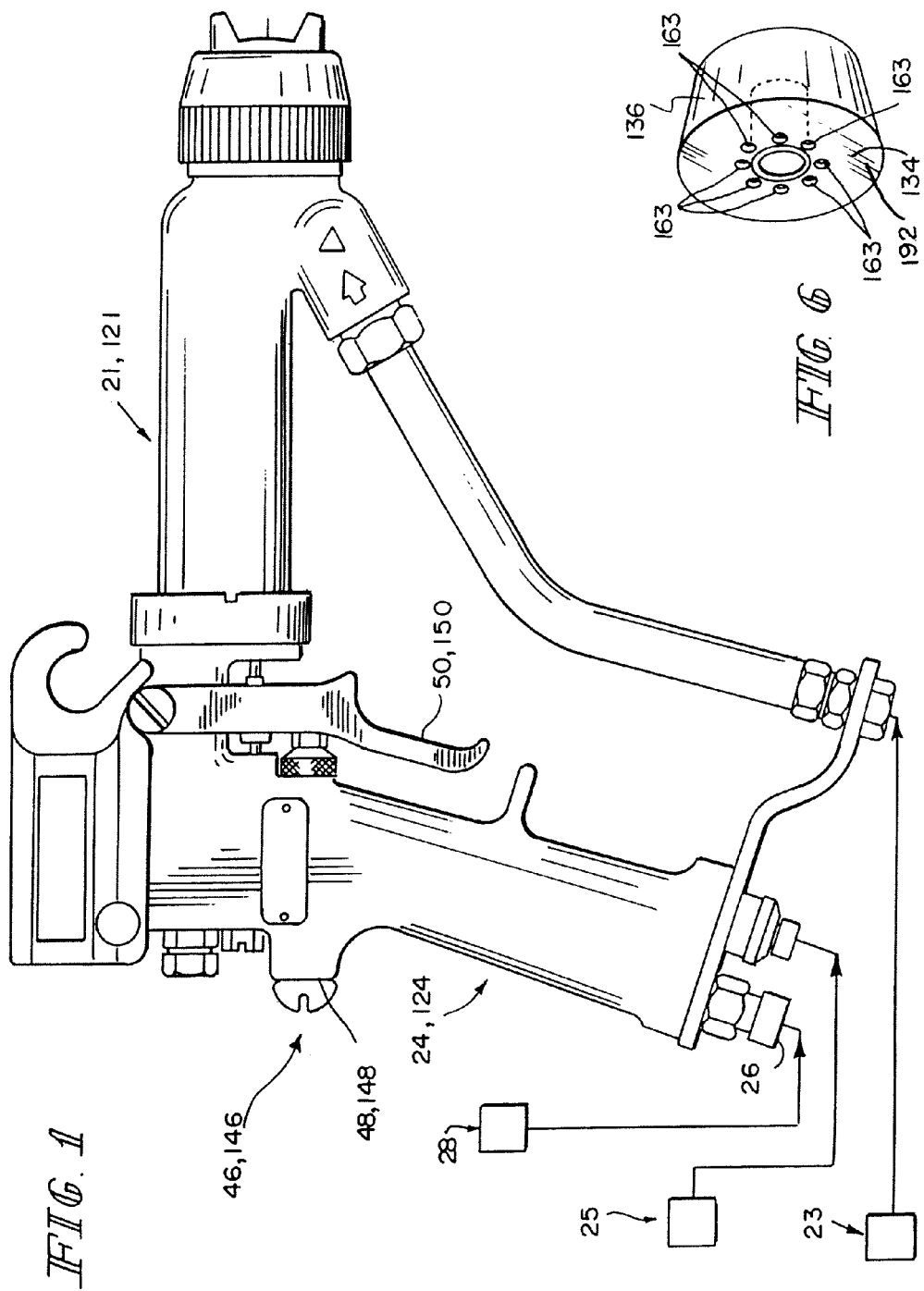
FIG. 1 illustrates a side elevational view of a gun.
Figure 2:
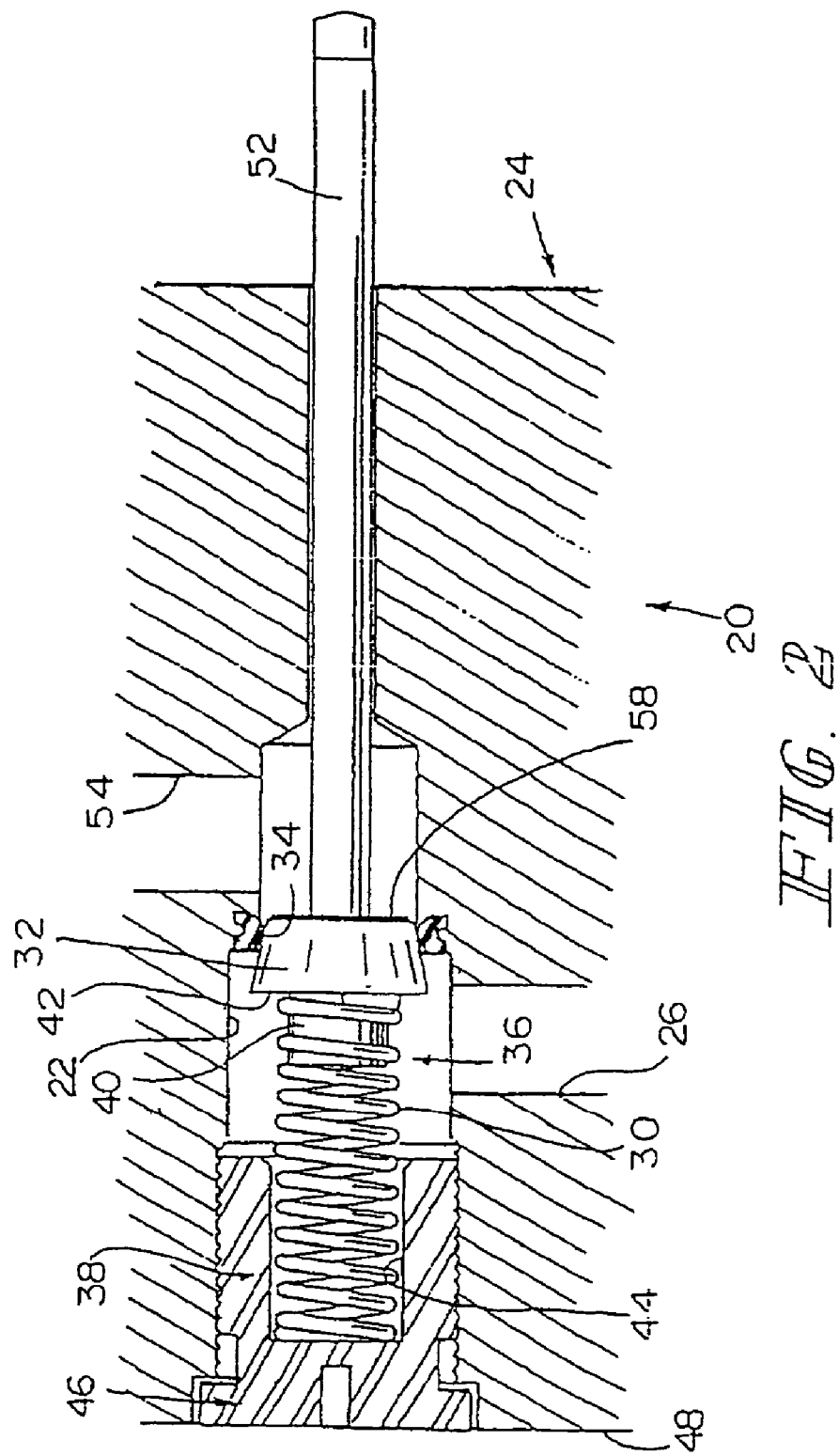
FIG. 2 illustrates a partial longitudinal sectional view through a prior art valve.

A prior art air valve 20 is illustrated in FIG. 2. Such valves 20 are used in a number of coating material dispensing devices 21, such as, for example, commercially available liquid coating dispensing guns. See FIG. 1. Guns 21 of this general type include, for example, the Ransburg model REA 3, REA 4, REA 70, REA 90, REM and M-90 all available from ITW Ransburg, 320 Phillips Avenue, Toledo, Ohio, 43612-1493. This listing is not exhaustive, as this is a common trigger air valve construction. Typically, gun 21 is coupled through appropriate fittings and the like to a source 23 of coating material to be atomized and dispensed from gun 21, a source 28 of compressed gas or mixture of gases, such as compressed air (hereinafter sometimes compressed gas or compressed air), and a source 25 of electrical potential, which is used in electrostatic charging and atomization of the coating material. Compressed air from source 28 is used, for example, in the process of atomizing and dispensing the coating material, cleaning the gun 21, and the like. Electrical potential from source 25 is used in electrostatic charging and atomization of the coating material. Sources 23, 28 and 25 are all illustrated in block diagram fashion in FIG. 1.

The valve 20 is housed in a passageway 22 formed in the generally pistol grip-shaped handle 24 of the gun 21. Air is supplied through a passageway 26 from compressed air source 28 to an upstream side of the valve 20 closure member 32. The air pressure, combined with the spring force provided by a coil spring 30, hold the air valve 20 closure member 32 against its seat 34 and seals the air off. The ends 36, 38 of the coil spring 30 are captured on a boss 40 provided on the upstream side 42 of the closure member 32 and in a well 44 provided in the slotted, threaded closure 46 which threads into the passageway 22 from the rear surface 48 of the handle 24.

The force applied by the operator of the gun 21 on the trigger 50 of gun 21 is transmitted through the valve 20's operating rod 52, pushing the rod 52 and closure member 32 rearward, and closure member 32 away from seat 34 to open the air valve 20 and permit air to flow in a passageway 54 upward and toward the front of gun 21. The force required to push the rod 52 and closure member 32 rearward is influenced by the pressure of the compressed air supplied from source 28. The higher the source 28 air pressure, the greater the force required by the operator to trigger the air valve 20 open. The force tends to be greatest just prior to opening of the valve 20. Once the valve closure member 32 moves away from the seat 34, the forces contributed by compressed air on the closure member 32 are brought closer to equilibrium, owing to the downstream side 58 of the closure member 32 being exposed to the pressure from source 28. This reduces the force required from the operator to keep the valve 20 open.

Figure 3:
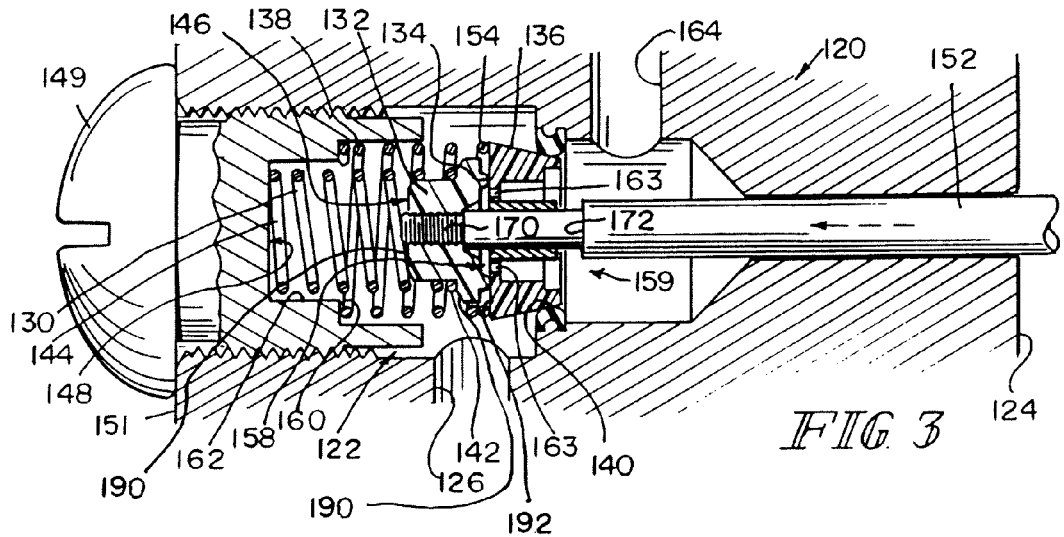
FIG. 3 illustrates a partial longitudinal sectional view through a valve constructed according to the invention, with the valve in a closed orientation.
Figure 4:
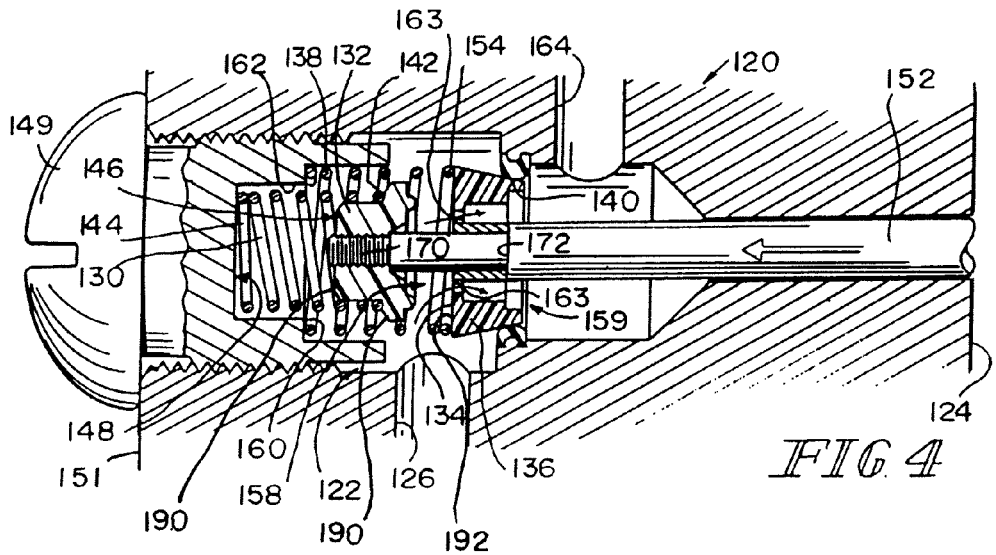
FIG. 4 illustrates a partial longitudinal sectional view through the valve illustrated in FIG. 3, with the valve in a partially open orientation.
Figure 5:
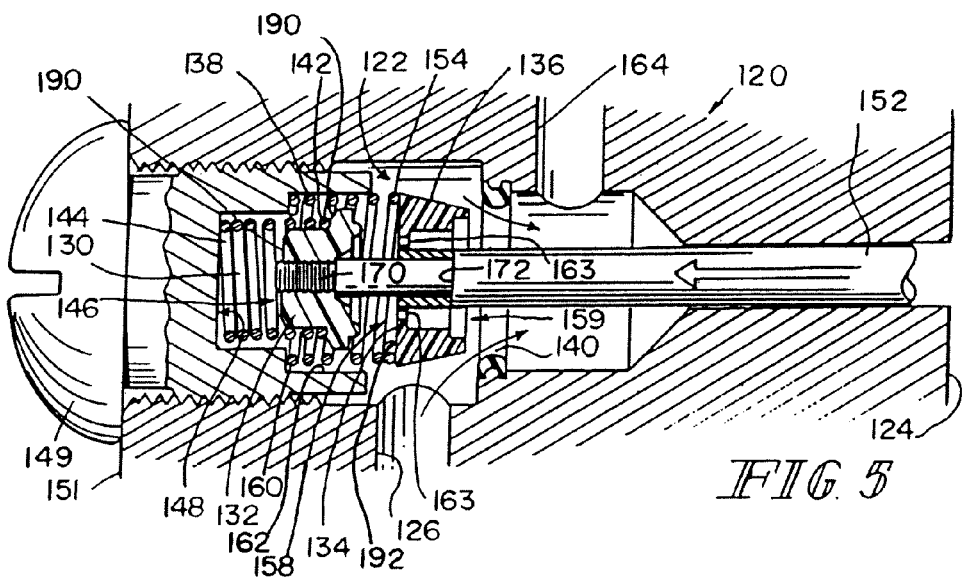
FIG. 5 illustrates a partial longitudinal sectional view through the valve illustrated in FIGS. 3-4, with the valve in a fully open orientation; and, FIG. 6 illustrates a perspective view of a detail of the valve illustrated in FIGS. 3-5, viewed from the upstream side.

A valve 120 constructed according to the invention is illustrated in FIGS. 3-5. Valve 120 is housed in a housing 122 formed in the generally pistol grip-shaped handle 124 of a gun 121. Air is supplied from a compressed air source 28 through port 126 which intersects housing 122 upstream of a first valve seat 134. The source 28 pressure, combined with the spring force provided by a spring 130, hold a first valve closure member 132 against seat 134 provided on the upstream side of a second valve closure member 136. The source 28 pressure, combined with the spring force provided by a spring 138, hold the second valve closure member 136 against a second valve seat 140. The ends 142, 144 of the spring 130 are captured between a seat provided on the upstream side 146 of closure member 132 and a seat provided in a well 148 in the threaded closure 149 which threads into the housing 122 from the rear surface 151 of the handle 124. The ends 154, 156 of spring 138 are captured between a spring seat provided on the upstream side 158 of closure member 136 and a spring seat 160 provided on the sidewall 162 of well 148.

The force applied by an operator on the trigger 150 of gun 121 is transmitted through the valve 120's operating rod 152, pushing the rod 152 and closure member 132 rearward, with the result that closure member 132 moves away from seat 134 in a first stage of opening of the air valve 120. See FIG. 4. Closure member 136 is provided with one or more passageways 163 radially inwardly toward operating rod 152 from seat 134. Passageways 163 extend through closure member 136 from its upstream side 158 to its downstream side 159 radially inwardly of seat 140. This permits air to flow in a passageway 164 upward and toward the front of gun 121. The area 190 of the upstream side 146 of the closure member 132 which is exposed to the source 28 pressure tending to hold closure member 132 against seat 134 is somewhat smaller than the combined area 190 plus 192 of the upstream side 146 of closure member 132 exposed to the source 28 pressure tending to hold closure member 132 against seat 134 plus the area 192 of the upstream side 158 of closure member 136 exposed to the source 28 pressure tending to hold closure member 136 against seat 140. Thus, less force is required to move the first closure member 132 from its seat 134 because of the reduced surface area 190 on the upstream side 146 of closure member 132 exposed to the source 28 pressure. Then, because movement of the first closure member 132 from its seat 134 tends to bring the pressure on the downstream side of closure member 134 closer to the source 28 pressure, less force is then required to move the second closure member 136 away from its seat 140. See FIG. 5. The spring constants of springs 130, 138 may be chosen to promote this operation, with the spring constant of spring 130 chosen to promote the opening of valve 132, 134 first.

End 170 of operating rod 152 is threaded into a threaded bore in first closure member 132 to capture first closure member 132 on operating rod 152. Operating rod 152 includes a shoulder 172 against which second closure member 136 is urged by spring 138. The engagement of second closure member 136 and shoulder 172 urges second closure member 136 away from seat 140 when operating rod 152 moves toward the left in FIGS. 3-5 a sufficient distance as trigger 150 is pulled. Compare FIGS. 4 and 5.

What is claimed is:

1. A manually operated, compressed gas-aided coating material dispensing device including a valve for controlling the flow of compressed gas through the device, the valve including:

a housing;

a first valve seat;

a first port upstream from first valve seat, the first port adapted to be coupled to a source for supplying compressed gas through the valve;

a first valve closure member for cooperating with the first valve seat to close the valve, preventing the flow of compressed gas between the first valve closure member and the first valve seat;

a second valve seat;

a second valve closure member downstream from the first valve closure member in the flow of compressed gas and cooperating with the second valve seat to prevent the flow of compressed gas between second valve closure member and second valve seat;

the second valve closure member being provided with one or more passageways extending through the second valve closure member from an upstream side of the second valve closure member to a downstream side of the second valve closure member;

an operating member adapted to be manipulated by an operator to move the first closure member away from the first valve seat in a first stage of opening of the valve, permitting compressed gas to flow in a second port downstream from the valve to bring the pressure on the downstream side of the second valve closure member closer to the source pressure so that less force is required to move the second closure member away from the second seat.

2. The apparatus of claim 1 further comprising a first spring, the source pressure combining with the spring force provided by the first spring to hold the first valve closure member against the first valve seat.

3. The apparatus of claim 2 further comprising a spring seat provided on the upstream side of the first valve closure member and a spring seat provided in the housing, the first spring captured between the spring seat provided on the upstream side of the first valve closure member and the spring seat provided in the housing.

4. The apparatus of claim 2 further comprising a second spring, the source pressure combining with the spring force provided by the second spring to hold the second valve closure member against the second valve seat.

5. The apparatus of claim 4 further comprising a spring seat provided on the upstream side of closure member and a spring seat provided on the housing, the second spring including ends captured between the spring seat provided on the upstream side of closure member and the spring seat provided on the housing.

6. The apparatus of claim 1 wherein the first valve seat surrounds the operating member and the one or more passageways are oriented radially inwardly from the first valve seat toward the operating member.

7. The apparatus of claim 1 wherein an area of the upstream side of the first valve closure member which is exposed to the source pressure tending to hold first valve closure member against the first valve seat is somewhat smaller than a combined area of the upstream side of the first valve closure member exposed to the source pressure tending to hold the first valve closure member against the first valve seat plus an area of the upstream side of the second valve closure member exposed to the source pressure tending to hold the second valve closure member against the second valve seat.

* * * * *